Sept. 6, 1966   R. J. RUFF   3,270,798
CATALYTIC RADIANT HEAT TREATING APPARATUS
Original Filed Sept. 19, 1961

INVENTOR:
Richard J. Ruff, Deceased
BY:
National Bank Of Detroit,
EXECUTOR:
BY:
James R. Hutson Jr.
Philip S. Liggett
ATTORNEYS United States Patent Office 3,270,798
Patented Sept. 6, 1966

3,270,798
CATALYTIC RADIANT HEAT TREATING
APPARATUS
Richard J. Ruff, deceased, late of Detroit, Mich., by National Bank of Detroit, executor, Detroit, Mich., assignor to Universal Oil Products Company, Des Plaines, Ill., a corporation of Delaware
Original application Sept. 19, 1961, Ser. No. 139,226. Divided and this application Nov. 19, 1964, Ser. No. 412,869
5 Claims. (Cl. 158—99)

This application is a division of Serial No. 139,226, filed September 19, 1961, now abandoned, which is a continuation-in-part of my earlier application Serial No. 797,935, filed March 9, 1959, now abandoned.

The present invention relates to improved means for effecting the infra-red heat treating of articles or materials and more particularly to an improved basic type of heat treating unit which utilizes a metallic catalytic element as a source of temperature radiant heat and is readily adapted to many uses.

Radiant heat has found wide application in space heating as well as the heat treatment of articles and materials, and also in cooking operations, for example broiling. In most cases, the source of such radiant heat has been electrically energized infra-red lamps or Calrod type heaters or in some instances gas fired burners in which the heat developed by combustion of the gas fuel is converted to radiant heat.

In the use of infra-red lamps as a source of radiant energy, it has been common practice to utilize a large number of such lamps together with suitable reflectors grouped closely together along the walls of an oven through which the work passes and the same type of apparatus is commonly utilized with Calrod heaters which also utilize reflectors to direct the radiant heat in a desired pattern. Electrically energized radiant heat sources are relatively convenient to use and are quite effective on certain types of work but there are several disadvantages to this type of heater in that the surface of the heater itself must be at relatively high temperature in order to produce the desired radiant energy and furthermore, the reflectors must be so designed and the work must be so positioned as to eliminate the possibility of producing hot spots on the work. Furthermore, the wave length of the infra-red energy is determined by the source temperature and since a relatively high source temperature is utilized in electrical units in order to produce a relatively large quantity of infra-red energy in a reasonably small space, it is sometimes difficult to provide the optimum wave length for the particular work being treated. Also, high surface temperatures for the heat sources result in a reduced heater life and in the event a single heating unit fails, the quality of the work is adversely affected.

Electrically energized heaters are not readily adaptable to proportional control since such heaters are either "On" or "Off" and where it is desired to secure an intermediate range of radiant energy, the control of electrically energized heaters is extremely difficult. Furthermore, the reflectors utilized with electrically energized heaters gradually become covered with dirt deposits thereby reducing the efficiency of the reflectors and since less energy is reflected, more energy is absorbed with a consequent increase in heat losses and furthermore, the heat treatment of the work passing through the oven is adversely affected by changes in heating conditions caused by dirty reflectors and even under the best conditions, a substantial portion of the heat released by an electrically energized heating element is transmitted through the reflector and absorbed in the insulation or in the room containing the oven. A further disadvantage of the electrically energized type of heater for use in radiant heating is the fact that electricity usually costs from three to seven times the cost of other fuels. As a result, it will be seen that other forms of radiant heat sources would be desirable for many applications.

Where gas is utilized as a fuel for radiant heating apparatus, it has been common practice to burn such gas in such a way that a flame impinges upon a ceramic which is capable of withstanding exceedingly high temperature and such ceramic may be of the cup type or line type where the source of high temperature consequently takes the appearance of either a circle or a line. The source temperature of such radiant energy is extremely high, ordinarily above 1700° F. and with proper adjustment of the air and gas mixture to the burner there is no visible evidence of a flame, the only apparent heat source being a white hot ceramic. Since with this type radiant source, also known as incandescent radiator, the source temperature must be exceedingly high, there is no possibility of controlling the actual wave length of the radiant energy reaching the work.

Where gas fired incandescent radiators are utilized, it has hitherto been necessary to position the work being treated at a relatively great distance from the burner in order to provide a desired degree of heat distribution and to avoid excessive heating or hot spots, and furthermore, furnaces utilizing gas fired radiant heat burners are of necessity relatively large and heavy and consequently quite costly to manufacture and install.

Gas fired burners providing radiant heat may be proportionately controlled so that high or low or any intermediate energy release is possible, but in order to accomplish this result, the source of radiant heat remains at substantially the same temperature and only the size of the source increases or decreases. This results in non-uniform diffusion of the radiant energy where the energy release is varied and consequently some difficulty may be experienced in properly treating the work subjected thereto.

Another type of radiant heating apparatus which has been developed more recently is the catalytic oxidation burner which relies on the catalyzed oxidation of fuel gas at the exposed or radiant heat-emitting side of a gas-permeable combustion element. However, heretofore, the designs have been such that emission surface temperatures are in the range of from 400° to 850° F. The previously known construction and arrangements have used porous beds of catalyst particles or catalytically impregnated fabric such that their infra-red radiation or heat output has necessarily been in the low range. In still other designs the temperature variations are obtained by controlling the supply of fuel gas, by means of a valve, to a gas distributing member extending across the back side of the catalytic element and permitting oxygen for supporting the combustion to reach the exposed side of the catalytic radiator by diffusion from the surrounding area backwardly to the catalyst surfaces. It has been found, however, that in approaching a maximum surface temperature of about 750° F. complete oxidation of the fuel gas is not achieved, apparently due to the increasing unreliability of sufficient oxygen diffusing to the catalyst surface against increased velocity of fuel gas passing through the catalytic combustion element. Moreover, an electric ignition device built into the catalytic combustion element is usually required for starting the combustion and attaining radiation temperature and this complicates both the manufacture and the use of such catalytic radiators.

It is an object of the invention to provide a radiant heating apparatus which is easy to manufacture and in which the source of radiant heat is a thin catalytic combustion element from which radiant energy will be released substantially uniformly over its entire surface.

A further object of the invention is the provision of a catalytic radiant heater which is highly resistant to mechanical as well as thermal shock and in which a thin catalytic combustion element or each of a plurality of such catalytic combustion elements functions without visible flame and in which substantially the entire radiant heat output is directed to a desired location or area without the use of conventional reflectors.

A further object of the invention is the provision of a radiant heating apparatus in which a catalytic combustion element is utilized as the source of radiant heat and an all-metal non-catalytic gauze layer is used in combination therewith in a manner which prevents back flow of heat from the catalytic combustion element thereby permitting utilization of substantially the entire heat output of the element.

A still further object of the invention is the provision of a radiant heating apparatus in which a catalytic combustion element or a plurality of such elements, utilized as the source of radiant heat, is adapted to being supplied uniformly with a mixture of fuel and air and can be brought to ignition temperature without the need of heating devices built into the catalytic element or elements and complete oxidation of fuel gas can be achieved equally well at relatively low and relatively high catalyst surface temperatures, including temperatures below as well as above 750° F. and even as high as 1800° F.

The present improved designs make use of one or more specially plated and treated metal alloy gauze (screen) as the catalytic element to affect the catalytic oxidation of the fuel stream and provide an infra-red radiant heating surface. The screen is electroplated with a noble metal, preferably platinum or palladium, or with mixtures thereof, to provide an oxidizing catalyst surface uniformly thereover. In some applications, other platinum group metals, or such metals as titanium, cobalt, etc., may be composited with the platinum during the coating step to give improved oxidation characteristics. The metallic catalytic coatings on high temperature resistant alloy screens provide means for obtaining highly efficient oxidation surfaces as well as high temperature emissions. Various metal alloy screens may be used as a gas pervious base; however, as will be set forth in greater detail hereinafter, a chromium-nickel gauze (such as those known as Chromel or Nichrome) of a fine mesh is the preferred base material for the catalytic coating. Also, as will be set forth hereinafter in greater detail, it has been found desirable to use thin catalyst elements comprising generally on one or two activated screens.

In a broad aspect, the catalytic radiation heater of the present invention provides for high temperature radiant heating in the infra-red range above about 850° F. and up to about 1800° F., comprising in combination a relatively thin metallic element of at least one gas pervious metal alloy gauze having a noble metal catalytic surface of substantially uniform thickness thereover to form a front heat radiating surface, at least one pervious gas distributing and heat reflective metal alloy gauze mounted in back of and co-extensively in contact with said catalytic element, and confined manifold means having air and fuel supply inlet means thereto encompassing the backside of said gas distributing and reflective gauze.

The present invention utilizes in combination with the catalytic element a heat reflective layer in back thereof in order to return, as far as possible, radiant heat from the catalytic element back to the emitting surface of the unit. Preferably, a porous fine mesh, heat resistant metal gauze or screen is utilized to "reflect" the heat back to the emitting surface. The term "reflect" as used herein refers to the ability to either effect the actual reflection of the heat back to the emitting surface or, alternatively, have the ability to absorb radiant heat and in turn give up such heat to a stream passing therethrough. Thus, as used in the present improved heating apparatus, at least one heat resistant alloy metal screen is used against the catalytic element whereby to reflect infra-red heat, as well as readily give up heat to the gaseous fuel stream which is distributed to the backside of the screen and flows toward the catalytic element. Other types of materials such as glass-wool or certain clean slag or mineral wools may have reflective abilities, but not necessarily with equivalent results, in that the individual strands are reflective and have the ability to readily give up any absorbed heat to a gaseous stream. On the other hand, where the wool-like material is of a dusty nature, or has embedded particles, then such material may be inefficient and actually dangerous in that heated embedded particles may have the ability to glow and cause a back-flashing into the incoming gaseous fuel mixture. Also, in many instances, the depth of mineral wool or distance back from the catalyst element of other distributor means can lead to flashbacks of flame to the fuel inlet nozzle.

Various porous substances, such as asbestos fibers, etc., have been used as fillers or packings in radiant heating apparatus; however, it has been found that an improved design and construction, providing better radiation characteristics, is obtained with the use of a more heat reflective type of material directly in back of a thin metallic heat radiating element. Thus, at least one gas pervious fine mesh type of metal screening is preferably mounted in contact with the catalytic element without intervening media therebetween to act as a reflector-diffuser whereby to uniformly diffuse the fuel stream and at the same time reflect heat forwardly and outwardly from the heating unit.

Thus, the catalytic radiation heater according to the present invention may also comprise one or more catalytic radiation units in each of which a metallic combustion element having noble metal surfaces extends in a relatively thin uniform thickness throughout the entire radiation surface and is mounted against and in front of a heat reflective gas distribution layer which consists of at least one metal screening which in turn has a uniform thickness and the ability to readily return heat to the heat emitting surface. Where a mineral wool layer or other relatively thick form of insulating material can be used without assisting in causing a flash-back, then such material may be used upstream from the reflector screen or screens; however, such materfial shall not be placed between the catalytic screen(s) and the reflector screen(s).

Further features of the invention will be apparent from the following more detailed description taken in conjunction with the accompanying drawings.

Figure 1:
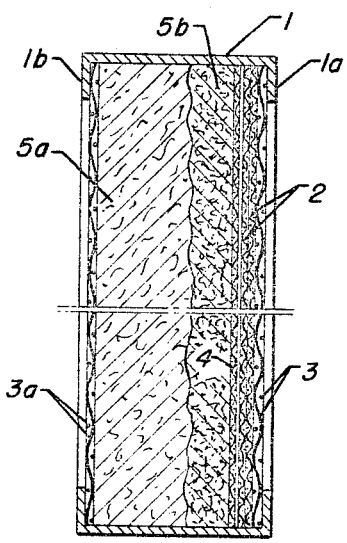
FIGURE 1 is a sectional view of a catalytic radiation unit showing one particularly advantageous construction.

Referring now to FIGURE 1 of the drawings, which illustrates diagrammatically one improved embodiment of the catalytic heat radiation unit, there is shown a casing or frame 1 that is provided with inwardly projecting flanges 1a and 1b adapted to hold the pervious gas distribution materials and the catalytic combustion element in desired adjacent or superimposed positions. The catalytically activated heat radiating surfaces is formed of at least one, and preferably of two coated alloy screens or gauze members such as 2, which are of a relatively fine mesh, such as in the 30- to 50-mesh range. The individual wire size should be relatively large for the mesh size, as for example in the range of 0.010 inch in diameter for 40-mesh gauze, of the order of 0.015 inch diameter for 30-mesh gauze, and say 0.0089-inch diameter for 50-mesh gauge, so as to be able to withstand movement from thermal expansion and thermal stresses. The metal or alloy of the base material and the catalytic coating of noble metal thereof may be in accordance with that set forth in U.S. Patent No. 2,658,742, issued November 10, 1953, to H. R. Suter and R. J. Ruff. Reference is made to this patent for a showing and description of the method for effecting the coating itself, and in view thereof, it is not believed necessary to specifically describe herein the coating procedure.

A preferred form of catalytic element for radiation of infra-red heat is, however, provided to be relatively thin as compared with an element suitable for the oxidation of exhaust fumes and as described in the aforesaid patent. The catalytic combustion element 2 is a relatively thin metallic element which has noble metal surfaces and is permeable to both air and fuel gas. This element may comprise one or more metal screens or metal gauzes fabricated of alloy of high thermal resistance and coated with palladium, platinum or any other of the noble metals such as osmium, ruthenium, rhodium and iridium, or a mixture of several of the noble metals, preferably with palladium, or a mixture of platinum and palladium. The catalytic element is of such nature that upon heating the same to ignition temperature and supplying a suitable mixture of fuel and air thereto, catalysis will take place along and over the entire surface resulting in the liberation of heat in the form of radiant energy.

The term "gauze" as used herein refers to the fine mesh metal screens, typically referred to in the trade as metal gauze. Also, the term "thin," as used herein with respect to the catalytically activated the element comprising the heat emitting surface of the unit which effects flameless catalytic oxidation of the fuel stream passing therethrough, refers to the actual physical thickness of element itself. Such element shall comprise at least one coated fine mesh metallic gauze, but generally will comprise two, or perhaps three, fine mesh metallic gauzes suitably activated with an oxidizing catalytic coating and placed together. A thick catalytic element, or say one comprising more than three layers of gauze, tends to have radiant heat absorbed by the layers in front of, or downstream with respect to gas flow. In other words, a thick element lets the products of combustion and the unburned fuel and air, including the large quantity of nitrogen in the air stream, become heated by virtue of the longer period of time during the downstream flow and the heat exchange type of contact with the catalytic element. A preferred infra-red heating operation burns catalytically the fuel on the surface of a thin element such that the products of combustion are released at the lowest possible temperature, with little or no heat absorption, and the fuel converted to radiant energy, to effect a temperature substantially higher on the catalytic screens than for the products of combustion leaving the screen.

On the exterior of the wall section, over the catalytic surface, is a protective covering or guard screen 3 which is relatively stiff and capable of generally preventing damage or deformation to the catalyzed screens, without causing the blocking of heat radiation therefrom. The guard screen 3 may be of relatively large gauge heat resistant alloy wire and may have openings in the range of from about ¼-inch by ¼-inch to ½-inch by ½-inch; however, other meshes may well be used to serve in the function of a protective layer.

Interiorly from the catalytic screens 2 is positioned an uncoated alloy wire gauze or screen layer 4 which serves to reflect radiant heat from the catalyzed members outwardly and away therefrom, as well as away from the gas distribution layers 5a and 5b, in a particularly efficient manner. The reflective member 4 is of advantage in that it assists in effecting an even distribution of air-fuel mixture to the catalyst layer and for precluding the transfer of heat rearwardly to the fuel inlet zone. The screen layer 4 is constructed of a heat resistant alloy and may be of a relatively fine mesh, i.e., of the same general size and range of mesh as that provided for the catalytically activated screens 2, although it may well be of a slightly smaller or larger range than the latter. Rearwardly from the reflective screen 4 may be provided layers 5a and 5b of mineral or metallic wool-like material. The interior layer 5b, adjacent the reflective screen 4 is, in the embodiment shown, more tightly packed or compressed than the outer layer 5a and is thus of higher density in the finished wall section of radiation unit. As set forth hereinbefore, the wool-like packing may serve to prevent any backward heat flow and to diffuse the mixed air-fuel stream flowing therethrough and provide a desired low velocity, even distribution to the catalytic surfaces. On the other hand, certain materials, or particles in the wool, may be detrimental by virtue of carrying heat back to the fuel inlet as noted hereinbefore. The reflective screen 4 primarily aids in precluding heat radiation upstream and lessens any chance of "flashbacks" or explosions carrying to the fuel source. When used, the relative density of each of the layers 5a and 5b and the open area in reflective screen 4 are correlated with the fuel supply system such that a desired flow rate and pressure drop is attained at the heat radiating catalyzed surface for a desired range of fuel input and radiant heat output. The rearward enclosing screen 3a is formed of a relatively stiff wire size, and of large mesh, providing means for retaining the wool-like layer 5a and 5b in place over the outer reflective and catalytic screens. Thus, the retaining screen 3a may be similar as to gauge and mesh to the exterior screen 3, but need not be limited to any predetermined gauge and spacing. Ordinarily, the thickness of the layer 5b will be greater than the thickness of the catalytic combustion element (screens 2) and less than the thickness of the layer 5a. Moreover, the pressure drop through the layer 5b may be greater than the pressure drop through the catalytic combustion element.

In the utilization of the improved metallic catalytic unit, a mixture of fuel and air is supplied through manifold means (not shown) to the backside of the unit and passed through the diffusing media to be uniformly distributed to the reflector gauze and to the catalytically active meal gauze, where flameless combustion of the fuel occurs. The initial ignition may be effected by applying a flame from a torch, or where desired, by burner means built into the fuel supplying manifold means.

Velocities through the diffuser-reflector media are generally low ranging from the order of about 2 to 5 feet per minute. The fuel-air mixture is fed to the gauze below the flammable range, and consequently no flame appears from the unit as the fuel is consumed on the catalytic surface of the active element after catalytic combustion takes over. The gauge heats to a dull red, or a bright red, or an intermediate glow, with temperature depending only on the ratio of the air-gas mixture to the unit. The fuel is generally supplied from liquefied petroleum gases; however, methane or natural gas may be utilized for the higher temperature operations.

Other modified and preferred embodiments of the improved catalytic heat radiating units may use more than one reflective screen, such as 4. Where the wool-like material is combined, the thickness of the wool-like layer is, of course, variable, depending upon the temperature level at which a particular radiant unit is to operate. Also, where two or more reflective metal screens are used, the thickness may be minimal or not used at all where of a type that may lead to back-flashing.

Figure 2:
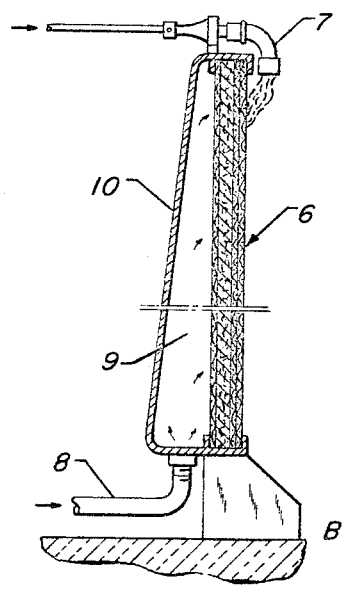
FIGURE 2 is a diagrammatic sectional elevational view indicating an externally mounted preheating burner in combination with a catalytic radiant heating unit.

Referring now to FIGURE 2 of the drawing, there is shown a unit 6 with a preheating arrangement in that a burner 7 is mounted exteriorly of the gas-air distribution chambers of the housing. The burner 7 is used in lieu of any interior form of burner to provide an initial heating of the catalytic combustion elements to a temperature sufficient for starting catalytic combustion of the air-fuel mixture. In this illustration, the gas-air mixture is shown as being supplied through line 8 directly to a gas-air manifold or distribution section 9 of the housing 10 and to the gas distribution and reflective layers in the panels of the radiant heating walls and thence uniformly through these layers to the outer catalytic combustion elements or catalyst screens. As the catalyst screens heat up the catalytic ignition takes over and all flames die out, leaving the catalyst screens to effect the desired conversion of gaseous fuel energy to infra-red energy which radiates directly from the surface of the elements. The unit 6 may be similar in construction to that shown in FIGURE 1 or may comprise merely one or more layers of coated metal gauze backed with one or more layers of uncoated reflector screen that are in contact with the upstream face of the catalyst element.

While the various heating units utilizing metallic catalytic combustion elements have been described as being generally thin and rectangular or cylindrical, it is, of course, understood that these units may be made in other shapes and also may be curved or formed in various configurations to correspond with the configuration of the material or articles being heat treated. Wire or bar stock may be continuously pulled through a radiant unit, rather than be carried by conveyor equipment.

It will be obvious to those skilled in the art that various changes may be made in the invention without departing from the spirit and scope thereof, and therefore the invention is not intended to be limited to all the details shown in the drawings and described in the specification.

I claim as my invention:

1. In a catalytic radiant heating apparatus adapted to provide high temperature radiant heating in the infra-red range above 850° F., the combination of a thin metallic element of at least one gas permeable metal alloy gauze having a noble metal catalytic coating of substantially uniform thickness thereover, at least one pervious gas distributing and heat reflective uncoated metal alloy gauze of substantially equal mesh size as the coated gauze in direct contact with the back of and coextensive with said catalytic element without intervening media therebetween, and confined manifold means having air and fuel supply inlet means thereto encompassing the backside of said gas distributing gauze.

2. The apparatus of claim 1 further characterized in that said catalytically coated metal alloy gauze and said heat reflective uncoated metal alloy gauze are in the 30 to 50 mesh size range.

3. In a catalytic radiant heating apparatus adapted to provide high temperature radiant heating in the infra-red range above 850° F., the combination of a thin metallic element of at least one gas permeable metal alloy gauze having a noble metal alloy coating of substantially uniform thickness thereover, at least one pervious gas distributing and heat reflective uncoated alloy gauze of substantially equal mesh size as the coated gauze mounted across the entire back of and coextensive with said catalytic element without any intervening media therebetween, a uniformly thick layer of pervious wool-like gas distributing and insulating material in back of and coextensive with said reflective metal gauze, and confined manifold means having air and fuel inlet means thereto encompassing the backside of said wool-like layer and said reflective metal gauze.

4. In a catalytic radiant heating apparatus adapted to provide high temperature radiant heating in the infra-red range above 850° F., the combination of a thin metallic element of at least one gas permeable metal alloy gauze having a platinum group metal electroplated thereon in a manner providing a catalytic coating of substantially uniform thickness thereover, at least one pervious gas distributing and heat reflective uncoated metal alloy gauze of substantially equal mesh size as the coated gauze in direct contact with the back of and coextensive with said catalytic element without any intervening media therebetween, and confined manifold means having fuel and air supply inlet thereto and encompassing the backside of said gas distributing gauze, whereby the fuel supply may be catalytically and flamelessly oxidized on the outer surface of said thin metallic element.

5. The apparatus of claim 4 further characterized in that the metal alloy gauze for both the catalytic element and the heat reflective gauze are in the 30- to 50-mesh size range and are of an alloy comprising nickel and chromium.

References Cited by the Examiner

UNITED STATES PATENTS

| | | |
|---|---|---|
| 1,326,767 | 12/1919 | Moore. |
| 1,753,897 | 4/1930 | Loeb. |
| 2,263,432 | 11/1941 | Wood et al. _____ 126—85 |
| 2,582,642 | 1/1952 | Mayer _____ 126—90 X |
| 2,607,663 | 8/1952 | Perry et al. |
| 2,742,437 | 4/1956 | Houdry. |
| 3,024,836 | 3/1962 | Bello. |
| 3,027,935 | 4/1962 | Sobole _____ 158—99 |
| 3,029,866 | 4/1962 | Honger _____ 158—114 |
| 3,057,400 | 10/1962 | Wagner _____ 158—99 |
| 3,107,720 | 10/1963 | Van Swinderen _____ 158—99 |

FOREIGN PATENTS

| | | |
|---|---|---|
| 565,879 | 4/1958 | Belgium. |
| 83,878 | 7/1957 | Denmark. |
| 856,484 | 3/1940 | France. |
| 867,148 | 7/1941 | France. |
| 1,136,829 | 1/1957 | France. |

FREDERICK L. MATTESON, JR., *Primary Examiner.*